United States Patent Office 3,346,956
Patented Oct. 17, 1967

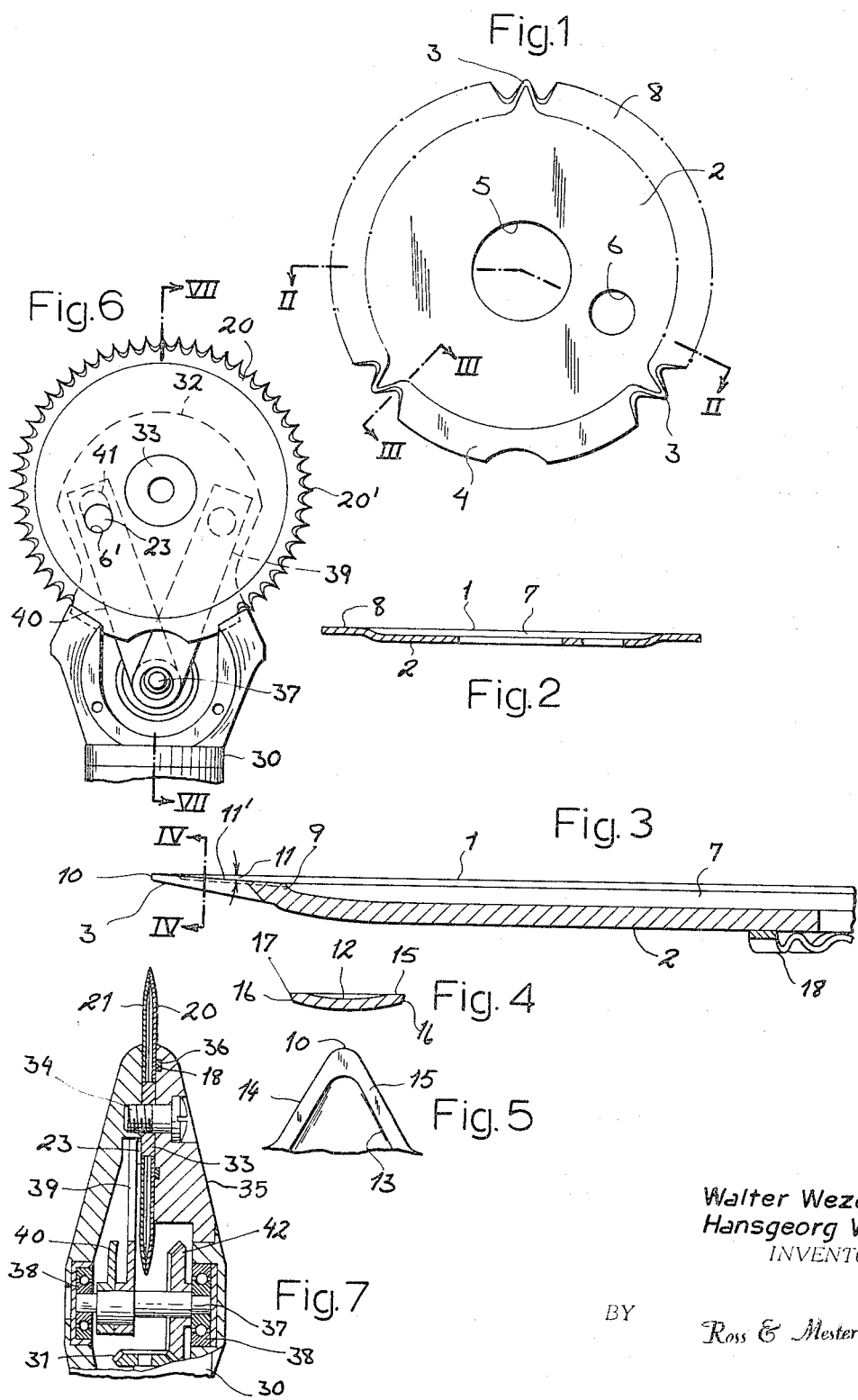

3,346,956
BLADE DISK FOR SKINNING DEVICES AND THE LIKE
Walter Wezel and Hans Wezel, Maulbronn, Wurttemberg, Germany, assignors to Firma Schmid & Wezel, Maulbronn, Wurttemberg, Germany, a corporation of Germany
Filed Sept. 23, 1965, Ser. No. 502,794
Claims priority, application Germany, Feb. 9, 1962, Sch 30,959
5 Claims. (Cl. 30—347)

ABSTRACT OF THE DISCLOSURE

A blade disk for skinning devices and the like having a dished concavo-convex central portion surrounded by a peripheral array of generally radial teeth along a marginal portion of the disk. The marginal portion being coaxial with the central portion whereby the central portion extends substantially up to the roots of the teeth which have blunt extremities flanked by sharp edges and have depressions terminating along lines parallel to the sharp edges and inwardly thereof along the concave surfaces of the disk.

---

This application is a continuation-in-part of copending application Ser. No. 250,598, filed January 10, 1963, now abandoned.

Our present invention relates to flaying blades and other separating disks for removing the skins, hides or pelts from animal carcasses by separating the integument from the flesh via a severing of the connecting membranes. In copending application Ser. No. 189,899, filed April 24, 1962 by Wezel et al., now U.S. Patent No. 3,184,785, there is shown a blade or separating disk of the aforementioned character which can be employed in a disintegument device of the type shown in commonly assigned application Ser. No. 250,638 made by Kurt Schuhmann, filed January 10, 1963, now U.S. Patent No. 3,176,397.

In general, blade disks of this type are relatively massive and of circular configuration and provided with a peripheral array of generally radial teeth and are juxtaposed with a similar blade in the skinning apparatus. The blades are reciprocated angularly with respect to one another so that the teeth of the two blades can sever the connecting membrane between the skin and the flesh of a calf, colt, horse or the like. The teeth are usually blunt and flanked with sharp cutting edges to effect a clean separation without tearing the valuable hides. The blades can be oscillated at a relatively high rate (e.g. about 5000 reciprocations per minute) so that their teeth, which slidably engage each other, are substantially self-sharpening. In all earlier devices, wherein the blades were composed of a single sheet of steel, strength consideration required that the sheet have a minimum thickness of about 1.5 mm. This resulted in exceptionally massive disks which considerably strained the drive mechanism. Moreover, the teeth of these disks had to be machined or ground, an operation requiring considerable skill and causing large manufacturing costs. A further disadvantage of these known blade disks was that they were almost completely planar so that the sharpening and consequent hardening steps often resulted in warping. Straightening of the warped disk was even more time-consuming than its manufacture.

It is an object of the present invention to provide an improved method of making blade disks for disintegument devices and the like.

A further object of the invention is to provide an improved blade disk which can be of lighter weight than those previously employed and yet be of high strength and free from warping.

Still another object of the invention is to provide an improved apparatus incorporating such blades.

These objects are attained, in accordance with the invention, by a method of making a blade disk for a skinning appliance which comprises the step of stamping a flat annular blank with a peripheral array of generally radially extending teeth and then cold or hot pressing a central portion of the plate to form a concavity therein inwardly of the array of teeth. Thus a plate having a thickness of about 0.8 mm., i.e. about half the thickness of the disks previously employed, can be dished to form a central portion of concavo-convex configuration. The shaping process preferably takes place without removal of the material or a substantial thinning of the latter so that at least the central portion of the disk has a thickness on the order of 0.8 mm. Since a disk produced in accordance with the present invention will have approximately half the mass of a disk of corresponding diameter employed hitherto, substantially less strain upon the reciprocating mechanism will result and a considerable saving in material can be effected. Thus the disk may, according to the invention, be composed of an expensive material such as a high-chromium stainless steel or the like and still be less costly than earlier blades. Moreover, the disks can oscillate at speeds on the order of 5000 reciprocations per minute without disadvantage. The disks are also characterized by a freedom from warping and other distortions and can be produced with a minimum of operation, inasmuch as the teeth can be provided with the outwardly tapering cutting edges by the stamping step, thereby permitting a further reduction in the manufacturing costs.

The pressing of the dished central portion of the disk can be effected under hot or cold conditions and preferably produces a circular concavity which is coaxial with the toothed marginal portion of the disk. This concavity extends radially substantially up to the roots of the teeth and has a radius equal to the major fraction of that of the disk with the marginal portion occupying the remainder. The disk has the strength, wear resistance and bending resistance characteristic of or somewhat greater than corresponding values for a planar disk and can be produced by an untrained worker so that low manufacturing costs can be maintained. The stiffness of the novel disk is, however, much greater than that of a planar blade.

The marginal portion may be so shaped, e.g. dished in the same pressing step which forms the central concavity, that the teeth terminate at a plane perpendicular to the axis of the annular plate and axially spaced from another plane parallel thereto and intersecting the disk at the junction between the concavity with the marginal portion. Thus the teeth extend somewhat axially outwardly so that, when two such disks are juxtaposed, only the tooth portions thereof slidingly engage.

According to another feature of the invention the teeth of both blade disks are provided with blunt extremities and sharp cutting edges flanking these extremities as well as with depressions facing laterally in the direction of the concavities and terminating along lines parallel to these edges. The depressions are produced by the pressing step in which the central concavity is forced. This configuration of the teeth increases their rigidity and is particularly advantageous when the teeth slidably engage each other over a considerable area as a consequence of the usual spring means which is axially effective to urge the blades lightly into engagement. When severing the skin of an animal from its carcass, blood, fatty acids, hair etc. frequently pass between the blades and, if they are not cleaned, cause the contacting surfaces of the teeth to adhere strongly together. The depressions limit such adherence by restricting the surface contact between the teeth to a narrow strip parallel to the cutting edges; the depressions also serve to clear any foreign matter, which happens to pass between the blades, away from the cutting edges. The depressions thus have outlines generally similar to those of the teeth.

Still another feature of the invention resides in the tapering down of the marginal portion of the disk outwardly from the central portion to the blunt extremities of the teeth, thereby rendering the latter resilient and yieldable to axially directed forces applied thereto. The aforementioned spring means can comprise a generally flat annular undulating spring, which is received within a recess in the housing of the device, and surrounds the axis of the blade. The housing preferably overlies the non-cutting portions of the blades and totally encloses the bearing means therefor. The marginal portions of the blades may themselves be concave in the direction of the central concavity (i.e. each other) or of frustoconical configuration. In the former case, the marginal portion can lie along a surface of revolution centered on the disk axis so that an axial cross-sectional plane through the marginal portion will show a curvature at its surface confronting the other disk while a similar plane through the frustoconical margin will reveal a straight line inclined slightly (e.g. about 1 to 5 degrees) to a plane perpendicular to the axis along which the teeth terminate.

The above and other objects, features and advantages of the present invention will become more readily apparent from the following description, reference being made to the appended drawing in which:

FIG. 1 is a plan view of the outer surface of a blade disk accordng to the invention;

FIG. 2 is a cross-sctional view taken along the line II—II of FIG. 1;

FIG. 3 is an axial cross-sectional view taken along the line III—III of FIG. 1 and drawn to an enlarged scale;

FIG. 4 is a cross-sectional view taken along the line IV—IV of FIG. 3;

FIG. 5 is a plan view of one of the teeth of the disks corresponding to the scale of FIG. 4;

FIG. 6 is a plan view of a skinning device employing a blade of the type shown in FIGS. 1–5 with the housing cover removed; and FIG. 7 is a cross-sectional view taken along the line VII—VII of FIG. 6.

In FIGS. 1–5 we show a separating blade whose inner surface 1 is formed with a central circular concavity 7 and whose outer surface 2 is convex so as to constitute a dished structure. A marginal zone or portion 8 of the disk is formed with a peripheral array of radial teeth 3 which extend arcuately about the disk except for a sector 4 which is free from such teeth. This sector always lies within the housing of the skinning device (FIGS. 6 and 7) and is thus untoothed. The dsk is provided with a central bore 5 upon which it is journaled in the housing and an eccentric bore 6 into which a connecting element on the reciprocating arm can pass for oscillating the disk.

As can be seen of FIGS. 2 and 3, the disk has a thickness on the order of 0.8 mm. and the configuration of a flat dished plate with a concavo-convex circular central portion whose concavity 7 terminates at the marginal portion 8. The teeth taper down outwardly from this junction toward their extremities 10 and are inclined at a slight angle 11 to the plane of these extremities. The roots 9 of the teeth extend almost to the concavity 7. The annular surface 11' of marginal portion 8 can be frustoconical or curved (in cross-section) so as to lie along an imaginary surface of revolution centered upon the axis. The curvature would thus be in an axial phase.

As can be seen from FIGS. 4 and 5, the deep sharp cutting edges 17 of the facets 16 flanking the blunt extremity 10 are paralleled by the borders 13 of a depression 12 in the surface of this teeth-bearing concavity 7. These depressions form contact strips 15 along the surfaces of which the teeth of the two blades begin. A flat annular undulating spring 18 urges the blades into contact at their tooth portions. The central concavity and the depressions of the teeth are formed by die pressing by any of the forging presses or other power presses described in chapter 13 of Marks' Mechanical Engineers' Handbook, Baumeister, McGraw-Hill, N.Y. (1958). The punching of the blank from sheet steel of 0.8 mm. thickness can be effected using a conventional punch press and die.

In FIGS. 6 and 7 there is shown a device for skinning the carcasses of cattle and the like, which comprises a handle 30 in which is mounted a source of motive power (e.g. an electric or pneumatic motor), whose driven gear 31 is seen in FIG. 7. The housing 32 of the blade portion of the device carries a pair of blades 20, 21 which are concave toward each other and have the configuration of the blade shown in FIGS. 1–5. These blades are journaled centrally upon a hub 33 which is held in place by a screw 34. The latter also joins a cover 35 to the blade portion 32 of the housing. Cover 35 is provided with a recess 36 in which the spring 18 is seated so as to bias the blades 20, 21 in axial direction. The tooth portion 20' of these blades extends outwardly of the housing 32. The latter is provided with a transmission consisting of a crankshaft 37, journaled in a pair of bearings 38, and a pair of arms 39, 40 which oscillate the blades. Arm 40 has a connecting element 23 which passes through the eccentric bore 6' of disk 20 via a slot 41 in blade 21 which has its eccentric bore serving as a pivot for arm 39. The hubs of these arms are eccentrically mounted upon the crankshaft 37 which is driven from gear 31 by a further bevel gear 42 meshing therewith. Thus, rotation of the crankshaft at a high speed can effect relative angular reciprocation of the disks so that their teeth can shear the connecting membrane between a skin and the flesh of an animal carcass.

The present invention admits of many modifications and adaptations which will be readily apparent to persons skilled in the art and are considered to be embraced within the spirit and scope of the appended claims.

We claim:

1. An annular blade disk of generally circular configuration formed with a marginal portion having aperipheral array of generally radially extending teeth and a laterally concavo-convex central portion integral with said marginal portion, said concavo-convex central portion extending substantially up to the roots of said teeth, said marginal portion being of generally arcuate configuration and centered on the axis of said disk, said central portion being generally coaxial with said marginal portion, said teeth having blunt extremities and sharp cutting edges flanking said extremities, said teeth being provided with depressions terminating along lines parallel to said edges and inwardly thereof along the concave surface of said disk, 2. A blade disk as defined in claim 1 wherein said marginal portion is tapered down from said central portion toward the extremities of said teeth.

3. A blade disk as defined in claim 2 wherein said extremities lie in a plane perpendicular to said axis and axially spaced from another plane parallel thereto and intersecting said disk at the junction of said marginal portion with said central portion.

4. A blade disk as defined in claim 3 wherein the inner surface of said marginal portion is of generally frusto-conical configuration.

5. A blade disk as defined in claim 3 wherein the disk is composed of stainless steel and the inner surface of said marginal portion is concave and lies along a surface of revolution centered on said axis.

References Cited

UNITED STATES PATENTS

| | | | |
|---|---|---|---|
| 1,501,049 | 7/1924 | Harper | 30—345 |
| 2,751,680 | 6/1956 | Wezel | 30—219 |
| 2,979,820 | 4/1961 | Thompson | 30—265 X |
| 3,176,397 | 4/1965 | Schumann | 30—219 |

FOREIGN PATENTS

| | | |
|---|---|---|
| 724,387 | 2/1955 | Great Britain. |

WILLIAM FELDMAN, *Primary Examiner.*

G. WEIDENFELD, *Assistant Examiner.*